(12) United States Patent
Yukawa et al.

(10) Patent No.: US 8,893,135 B2
(45) Date of Patent: Nov. 18, 2014

(54) DIGITAL BROADCAST RECEIVER AND SOFTWARE STARTUP METHOD

(75) Inventors: Jun Yukawa, Tokyo (JP); Satoru Tokuyama, Tokyo (JP); Kensuke Ueda, Tokyo (JP); Satoko Miki, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 497 days.

(21) Appl. No.: 13/181,188

(22) Filed: Jul. 12, 2011

(65) Prior Publication Data

US 2012/0030728 A1 Feb. 2, 2012

(30) Foreign Application Priority Data

Jul. 30, 2010 (JP) ................ 2010-172369

(51) Int. Cl.
*G06F 9/46* (2006.01)
*H04N 7/16* (2011.01)
*G06F 9/44* (2006.01)
*G06F 9/445* (2006.01)
*H04N 21/443* (2011.01)
*G06F 9/48* (2006.01)

(52) U.S. Cl.
CPC ........ *G06F 9/4881* (2013.01); *G06F 2209/485* (2013.01); *G06F 2209/484* (2013.01); *G06F 9/44* (2013.01); *G06F 9/445* (2013.01); *H04N 21/4432* (2013.01); *G06F 9/4418* (2013.01); *G06F 9/4401* (2013.01)
USPC ............................ 718/102; 718/104; 725/151

(58) Field of Classification Search
CPC ... G06F 9/4401; G06F 9/4406; G06F 9/4416; G06F 9/445; G06F 2209/484; G06F 2209/485; G06F 9/488; G06F 9/4418; G06F 9/44; G06F 9/4881; G05B 19/0426; H04N 1/10; H04N 19/00; H04N 21/4432
See application file for complete search history.

(56) References Cited

U.S. PATENT DOCUMENTS 6,154,832 A * 11/2000 Maupin .................... 712/228
6,473,855 B1 * 10/2002 Welder ..................... 713/2
(Continued)

FOREIGN PATENT DOCUMENTS

JP 2000-322264 A 11/2000
JP 2006-260092 A 9/2006
(Continued)

OTHER PUBLICATIONS

Gibbons ("A historical Application profiler for use by parallel schedulers", 1997, university of Columbia, pp. 1-20).*

(Continued)

*Primary Examiner* — Meng An
*Assistant Examiner* — Caroline H Arcos
(74) *Attorney, Agent, or Firm* — Birch, Stewart, Kolasch & Birch, LLP

(57) ABSTRACT

A digital broadcast receiver schedules the startup of its software on the basis of the number of data transfer channels and core processing units available to transfer the necessary programs into main storage and execute them, the execution priority order of the programs, the time required to transfer each necessary program into main storage, and the time required to initialize each program. If a snapshot startup option exists for a program, the initialization time is compared with the time required for transferring the snapshot of the program's working data and for further post-processing. Consideration of the data transfer times and initialization times as well as execution priority enables the shortest schedule to be determined.

6 Claims, 12 Drawing Sheets

(56) References Cited

U.S. PATENT DOCUMENTS

| | | | |
|---|---|---|---|
| 6,564,177 B1 | 5/2003 | Matsunaga | |
| 7,299,347 B1 * | 11/2007 | Kao | 713/2 |
| 2002/0065646 A1 * | 5/2002 | Waldie et al. | 703/26 |
| 2005/0108771 A1 * | 5/2005 | Kim | 725/132 |
| 2010/0070750 A1 | 3/2010 | Yamamoto | |

FOREIGN PATENT DOCUMENTS

| | | |
|---|---|---|
| JP | 2006-262090 A | 9/2006 |
| JP | 2007-206933 A | 8/2007 |
| JP | 2009-59272 A | 3/2009 |
| JP | 2009-176151 A | 8/2009 |
| JP | 2009-187134 A | 8/2009 |
| JP | 2009-259076 A | 11/2009 |
| JP | 2010-92458 A | 4/2010 |
| JP | 2010-140156 A | 6/2010 |
| JP | 2010-217945 A | 9/2010 |
| JP | 2010-217946 A | 9/2010 |

OTHER PUBLICATIONS

Wikibooks ("X86 Assembly/bootloaders", Jan. 2010; pp. 1-10).*

* cited by examiner

FIG.6A

| | EXECUTION PRIORITY | SOFTWARE PROGRAM DATA TRANSFER TIME | SOFTWARE PROGRAM INITIALIZATION TIME | DEPENDENCY ON OTHER SOFTWARE PROGRAM |
|---|---|---|---|---|
| SOFTWARE PROGRAM A | 5 | 1 | 1 | NONE |
| SOFTWARE PROGRAM B | 4 | 1 | 1 | A |
| SOFTWARE PROGRAM C | 3 | 1 | 1 | B |
| SOFTWARE PROGRAM D | 2 | 1 | 1 | C |
| SOFTWARE PROGRAM E | 1 | 5 | 1 | D |

FIG.6B

| NUMBER OF DATA TRANSFER CHANNELS | 2 | DATA TRANSFER CONCURRENCY LIMIT Nd | 2 |
|---|---|---|---|
| NUMBER OF CORE PROCESSING UNITS | 1 | CORE PROCESSING CONCURRENCY LIMIT Nc | 1 |

FIG. 7A

| | DATA TRANSFER START TIMING | EXECUTION START TIMING | DEPENDENCY ON OTHER SOFTWARE PROGRAM |
|---|---|---|---|
| SOFTWARE PROGRAM A | 1 | 2 | NONE |
| SOFTWARE PROGRAM B | 2 | 3 | A |
| SOFTWARE PROGRAM C | 3 | 4 | B |
| SOFTWARE PROGRAM D | 4 | 5 | C |
| SOFTWARE PROGRAM E | 1 | 6 | D |

FIG. 7B

| DATA TRANSFER CONCURRENCY LIMIT $N_d$ | 2 |
|---|---|
| CORE PROCESSING CONCURRENCY LIMIT $N_c$ | 1 |

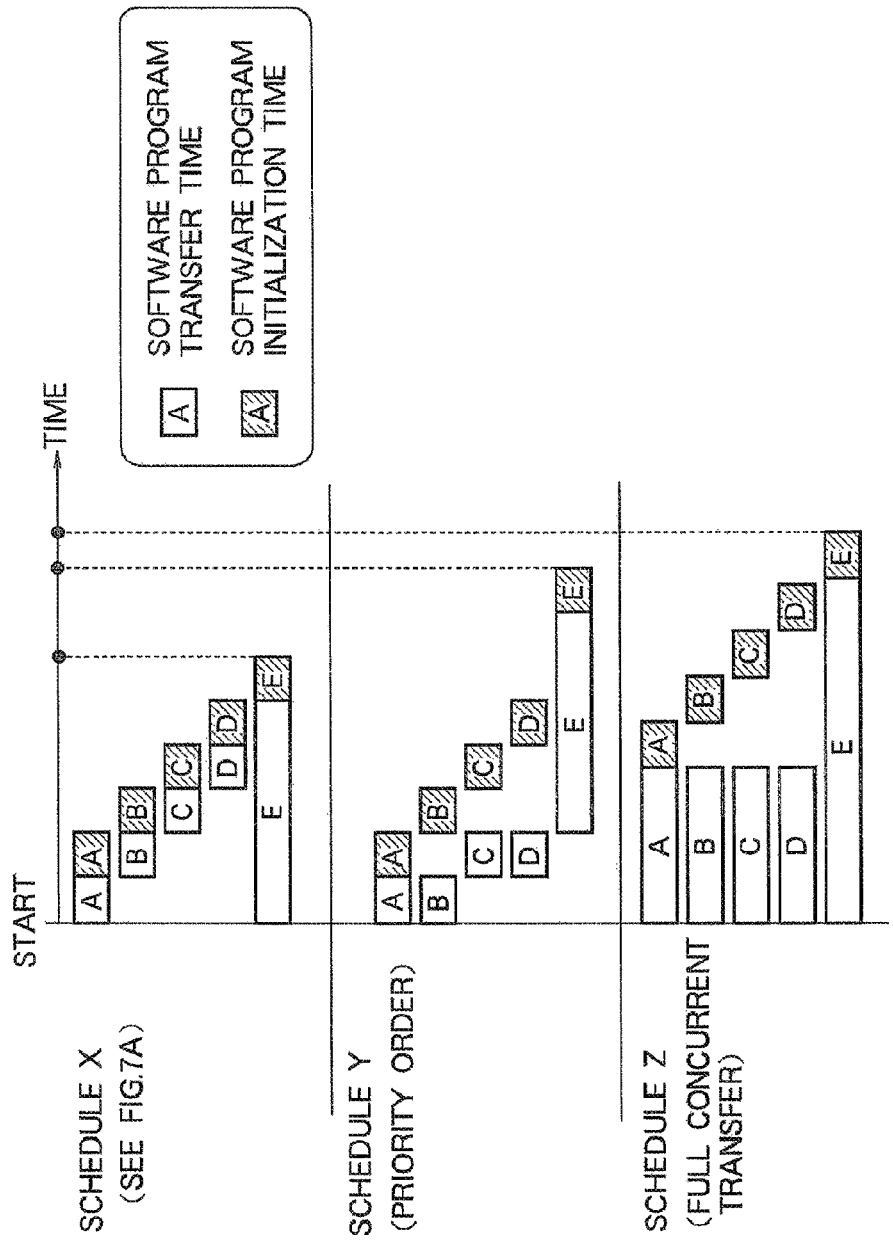

FIG.9A

| | PRIORITY | TYPE OF STARTUP | SOFTWARE PROGRAM DATA TRANSFER TIME | WORKING DATA TRANSFER TIME | SOFTWARE PROGRAM INITIALIZATION TIME | DEPENDENCY ON OTHER SOFTWARE PROGRAM |
|---|---|---|---|---|---|---|
| SOFTWARE PROGRAM F | 3 | NORMAL STARTUP | | 0 | 4 | NONE |
| | | SNAPSHOT STARTUP 1 | 1 | 1 | 2 | |
| | | SNAPSHOT STARTUP 2 | 1 | 2 | 1 | |
| SOFTWARE PROGRAM G | 2 | NORMAL STARTUP | | 0 | 4 | F |
| | | SNAPSHOT STARTUP 1 | 1 | 4 | 3 | |
| SOFTWARE PROGRAM H | 1 | NORMAL STARTUP | 4 | 0 | 1 | G |

FIG.9B

| NUMBER OF DATA TRANSFER CHANNELS | 2 | DATA TRANSFER CONCURRENCY LIMIT Nd | 2 |
|---|---|---|---|
| NUMBER OF CORE PROCESSORS | 1 | CORE PROCESSING CONCURRENCY LIMIT Nc | 1 |

FIG.10A

| | TYPE OF STARTUP | DATA TRANSFER START TIMING | EXECUTION START TIMING | DEPENDENCY ON OTHER SOFTWARE PROGRAM |
|---|---|---|---|---|
| SOFTWARE PROGRAM F | SNAPSHOT STARTUP 1 | 1 | 2 | NONE |
| SOFTWARE PROGRAM G | NORMAL STARTUP | 2 | 3 | F |
| SOFTWARE PROGRAM H | NORMAL STARTUP | 1 | 6 | G |

FIG.10B

| DATA TRANSFER CONCURRENCY LIMIT Nd | 2 |
|---|---|
| CORE PROCESSING CONCURRENCY LIMIT Nc | 1 |

DIGITAL BROADCAST RECEIVER AND SOFTWARE STARTUP METHOD

BACKGROUND OF THE INVENTION

1. Field of the Invention

The present invention relates to a digital broadcast receiver, more particularly to a digital broadcast receiver that is ready to start displaying a video picture from a received digital broadcast signal a short time after being powered on, and to the startup method it employs.

2. Description of the Related Art

To offer various digital broadcasting services, besides audio and video information, digital broadcasters transmit additional information such as text or still picture data information and bidirectional interactive information based on input from the viewer. The software programs (also referred to as application programs) for executing such services have functions that are more varied and advanced than the functions used to receive conventional broadcasting. Digital broadcast receivers therefore use a general-purpose operating system (OS) to execute the programs.

In a digital broadcast receiver using an OS, software program data for each of these digital broadcasting services are read from a nonvolatile memory, where the programs are stored, into a random access memory (RAM) where the programs are executed, the reading and execution being under the control of a central processing unit (CPU). When a software program is executed, it generally starts by carrying out preparatory (initialization) processing which is necessary before the processing that implements the service functions can be carried out. Some of the functions implemented by software programs require a prodigious amount of initialization computation, which can take considerable time. The snapshot startup feature of the OS is sometimes used to shorten the startup time.

When a software program is initialized, the results of the initialization process are stored in the RAM. Data generated after the initialization process are also stored in the RAM. The data stored in the RAM during and after initialization will be referred to as working data. To prepare for a snapshot startup, the operating system saves the working data into the nonvolatile memory. Then in a snapshot startup, the operating system reads the software program data and the working data from the nonvolatile memory into the RAM, performs the minimum necessary amount of post-processing, and immediately lets the program start executing its function, skipping the initialization process. The combination of the software program data and the working data read in a snapshot startup will be referred to as snapshot data.

Even though the lengthy initialization processing of the software programs that implement the various functions of a digital broadcast receiver is skipped, however, the amount of working data that must be loaded into the RAM is large. If the digital broadcast receiver were to create a single snapshot of all the software programs it is executing, a great amount of snapshot data would have to be read from the nonvolatile memory at the next startup. This type of snapshot startup could take longer than a normal startup.

A startup method disclosed in Japanese Patent Application Publication No. 2009-176151 (page 4, FIG. 2) therefore creates separate snapshots of different programs and reads the separate snapshots in a sequence determined from data dependencies of the working data, or simply in the sequence in which the programs are needed. The time required to transfer snapshot data from the nonvolatile memory to the RAM and the time required for post-processing after the snapshot data have been read has not been considered, however, in determining the order in which the snapshots are read in conventional digital broadcast receivers. If the startup procedure includes snapshot data requiring a long transfer time or lengthy post-processing, the startup time is not necessarily reduced to any significant extent.

For example, if the snapshot data reading sequence is determined in accordance with the data dependencies of the working data so as to minimize the rewriting of data in the RAM, snapshot data that are not necessary for receiving ordinary broadcasts may be read before other more essential snapshot data. When the snapshot data transfer time is long, this can significantly delay the start of broadcast reception.

An alternative startup method, disclosed in Japanese Patent Application Publication No. 2010-140156 (page 3, FIG. 1), determines what components of the receiver are required to start a particular function and reads only the snapshot data needed by those components. When a plurality of functions are started in sequence, however, this method does not always reduce the startup time. For example, suppose that the snapshot data of function A (e.g., tuner control) and function B (decoder control) are read to start receiving a broadcast. The software program of function A has a high priority level and a relatively small snapshot data size, and its snapshot post-processing is very short. The software program of function B has a lower priority level and more snapshot data, and requires more snapshot post-processing. If the order in which the software programs are started is determined just by execution priority, then the programs of functions A and B will be started from their individual snapshots in this order (A->B). The reverse order (B->A), however, might shorten the startup time by allowing the snapshot data of function A to be read during the post-processing of function B. In some other cases, such as when the first two functions to be started are a broadcast receiving function and an electronic program guide function, the electronic program guide function cannot start during the initialization of the broadcast receiving function. The electronic program guide function and all other functions must wait until the broadcast receiving function is completely started.

SUMMARY OF THE INVENTION

An object of the present invention is to shorten the time from when a digital broadcast receiver is powered on until it is ready to start displaying a video picture from a received digital broadcast signal.

Another object of the invention is to shorten the time from when the digital broadcast receiver is powered on until all functions of the digital broadcast receiver become available.

A digital broadcast receiver according to this invention includes a broadcast signal decoder for decoding a received digital broadcast signal, an output unit for output of audio information, video information, and additional information decoded by the broadcast signal decoder, an auxiliary storage unit having a software program storage section for storing software programs and an attribute data storage section for storing attribute data of the software programs, a main storage unit for storing the software programs when the software programs are executed, a data transfer unit for transferring the software programs and attribute data stored in the auxiliary storage unit to the main storage unit on one or more data transfer channels, a main control unit for controlling the above elements and for controlling the execution of the software programs that have been stored in the main storage unit, and at least one core processing unit that executes the software programs under the control of the main control unit.

The main control unit includes a startup process type acceptor, a software program classifier, a scheduler, a data transfer controller, and a software program executor.

The startup process type acceptor accepts an instruction specifying a startup process type.

The software program classifier selects the software programs necessary for startup according to the startup process type specified in the instruction accepted by the startup process type acceptor.

The scheduler creates a schedule for transferring and beginning execution of the software programs selected by the software program classifier, based on first information concerning the number of concurrently available data transfer channels and the number of concurrently available core processing units, second information, included in the attribute data stored in the attribute data storage section of the auxiliary storage unit, concerning an execution priority order for execution of the software programs selected by the software program classifier, third information concerning time required for transferring the software programs selected by the software program classifier, and fourth information concerning time required for initialization processing of the software programs selected by the software program classifier.

The data transfer controller controls the data transfer unit according to the created schedule.

The software program executor executes the software programs selected by the software program classifier that have been stored in the main storage unit.

Since the digital broadcast receiver of the present invention includes a scheduler, a data transfer controller, and a software program executor as described above, even if the software programs selected by the software program classifier include a software program having a low execution priority level or a software program with working data that requires a long transfer time, a schedule for transferring and beginning execution of the software programs can be determined so as to reduce the overall software program startup time. Consequently, the startup time of the receiver can be reduced, which is convenient for the user.

BRIEF DESCRIPTION OF THE DRAWINGS

In the attached drawings:

FIGS. 6A and 6B list information input to calculate the startup schedule according to the first embodiment;

FIG. 7A shows an exemplary startup schedule in the first embodiment;

FIG. 7B lists limiting conditions for the schedule in FIG. 7A;

FIG. 8 is a graph comparing the startup times of different schedules created by the scheduler in the first embodiment;

FIGS. 9A and 9B list information input to calculate the startup schedule of a digital broadcast receiver in a second embodiment;

FIG. 10A shows an exemplary startup schedule in the second embodiment;

FIG. 10B lists limiting conditions for the schedule in FIG. 10A;

DETAILED DESCRIPTION OF THE INVENTION

Embodiments of the invention will now be described with reference to the attached drawings.

First Embodiment

Figure 1:
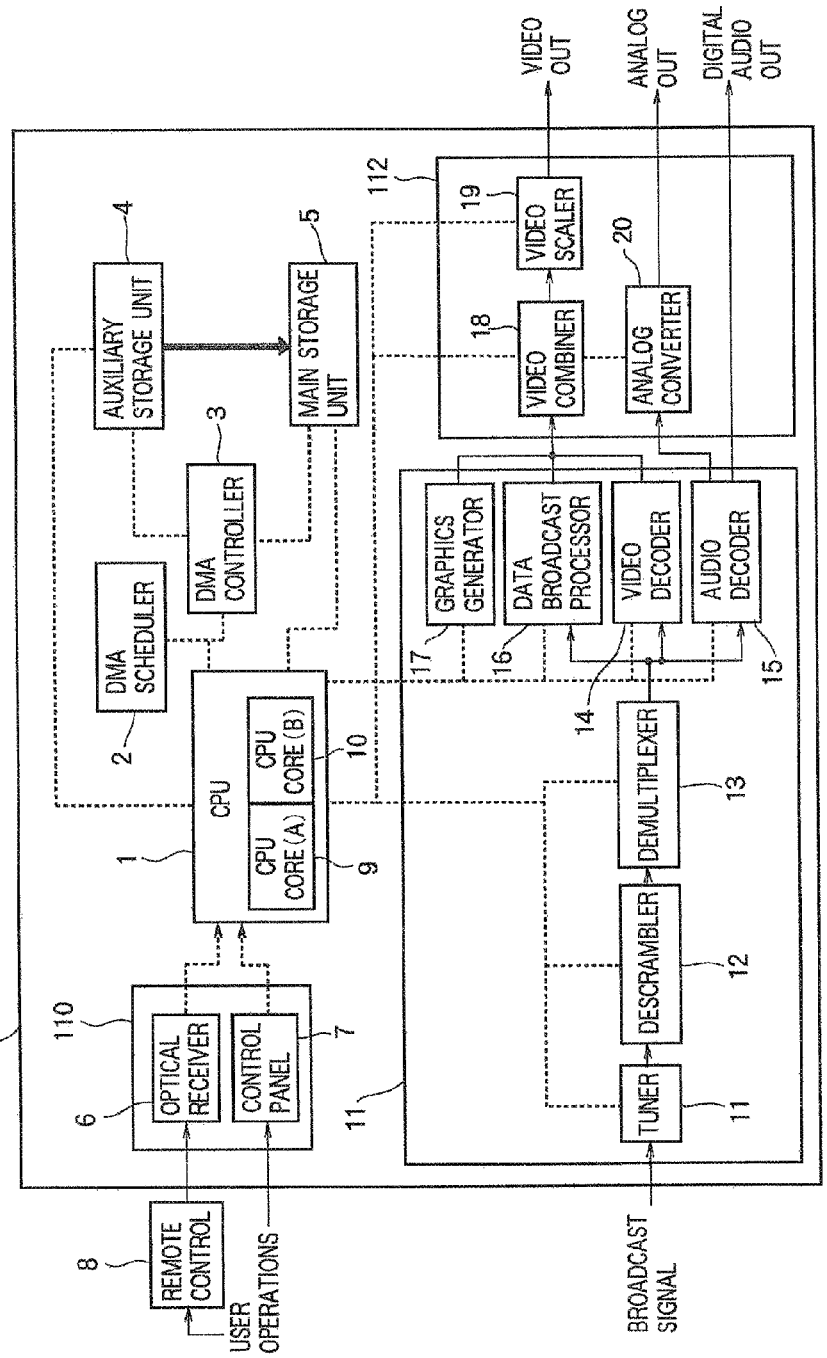
FIG. 1 is a block diagram illustrating the structure of a digital broadcast receiver according to a first embodiment of this invention.

FIG. 1 is a block diagram illustrating the structure of a digital broadcast receiver according to a first embodiment of this invention. The digital broadcast receiver 100 in FIG. 1 includes a central processing unit (CPU) 1 that controls the entire receiver 100, a CPU core-A 9 and a CPU core-B 10, which are functional units that carry out the core processing of the CPU 1, a direct memory access (DMA) controller 3 that handles data transfer in the digital broadcast receiver 100, a DMA scheduler 2 that determines the data transfer procedure to be executed in the DMA controller 3, an auxiliary storage unit 4 that holds program data, a main storage unit 5 that stores data when the program data are executed, a control panel 7 that allows direct user input to the digital broadcast receiver 100, a remote control 8 that allows remote user input, an optical receiver 6 that receives user input from the remote control 8, a tuner 11 that brings an input broadcast signal into the digital broadcast receiver 100, a descrambler 12 that descrambles scrambled broadcast signals input from the tuner 11, a demultiplexer 13 that demultiplexes audio, video, and additional signals, such as data broadcast signals, from the descrambled broadcast signal received from the descrambler 12, a video decoder 14 that decodes the video signal output from the demultiplexer 13 and recovers the original video information, an audio decoder 15 that decodes the audio signal output from the demultiplexer 13 and recovers the original audio information, a data broadcast processor 16 that generates on-screen information from the data broadcast signal output from the demultiplexer 13, a graphics generator 17 that generates graphics displays for on-screen user operations, a video combiner 18 that combines the video information generated by the video decoder 14, data broadcast processor 16, and graphics generator 17, a video scaler 19 that converts the combined video information to a desired output format, and an analog converter 20 that converts the digital audio information output by the audio decoder 15 to an analog audio signal.

The CPU 1 controls the elements in the digital broadcast receiver 100 to descramble the input broadcast signal and present audio information, video information, and additional information to the user. The CPU 1 has two functional units, a CPU core-A 9 and a CPU core-B 10, so that two processing procedures can be executed concurrently.

Figure 2:
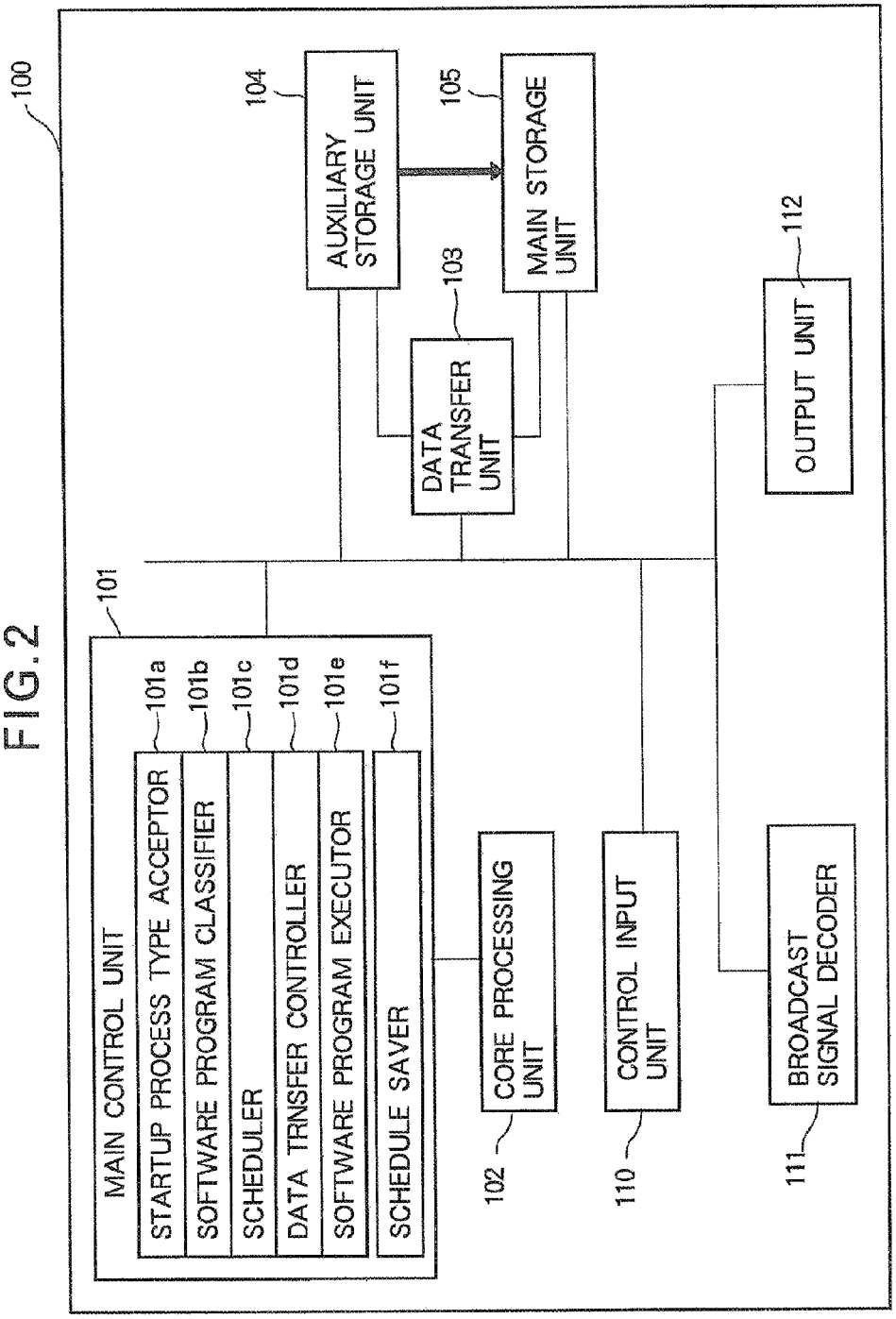
FIG. 2 is a functional block diagram illustrating the structure of the digital broadcast receiver in FIG. 1 in a different way.

FIG. 2 is a block diagram illustrating the structure of the digital broadcast receiver 100 in this embodiment in a simplified form. The functional elements in this simplified representation are a main control unit 101 for controlling the general operation of the digital broadcast receiver 100, at least one core processing unit 102 operating as a functional unit that executes processing under control of the main control unit 101, a data transfer unit 103 for transferring data in the digital broadcast receiver 100, an auxiliary storage unit 104 having a software program storage section for storing software programs and an attribute data storage section for storing attribute data of the software programs, a main storage unit 105, a control input unit 110 for user input, a broadcast signal decoder 111 for decoding the received digital broadcast signal, and an output unit 112 for output of audio information, video information, and additional information decoded by the broadcast signal decoder 111. The main control unit 101 represents the general control functions of the CPU 1 in FIG. 1. The core processing unit 102 represents the functions of a CPU core such as CPU core-A 9 or CPU core-B 10. The data transfer unit 103 represents the functions of the DMA scheduler 2 and DMA controller 3 in FIG. 1. The auxiliary storage unit 104 and main storage unit 105 correspond to the auxiliary storage unit 4 and main storage unit 5 in FIG. 1. The control input unit 110 includes the remote control receiver 6 and control panel 7 in FIG. 1. The broadcast signal decoder 111 includes the tuner 11, descrambler 12, demultiplexer 13, video decoder 14, audio decoder 15, data broadcast processor 16, and graphics generator 17 in FIG. 1. The output unit 112 includes the video combiner 18, video scaler 19, and analog converter 20 in FIG. 1.

The main control unit 101 includes: a startup process type acceptor 101a for accepting an instruction specifying a startup process type; a software program classifier 101b for selecting the software programs necessary for startup according to the startup process type specified in the instruction accepted by the startup process type acceptor 101a; a scheduler 101c for creating a schedule for transferring and beginning execution of the software programs selected by the software program classifier 101b, based on first information concerning the number of concurrently available data transfer channels and the number of concurrently available core processing units, second information, included in the attribute data stored in the auxiliary storage unit, concerning an execution priority order for execution of the software programs selected by the software program classifier, third information concerning time required for transferring the software programs selected by the software program classifier, and fourth information concerning time required for initialization processing of the software programs selected by the software program classifier; a data transfer controller 101d for controlling the data transfer unit 103 according to the created schedule; and a software program executor 101d for executing the software programs selected by the software program classifier 101b that have been stored in the main storage unit 105. A schedule saver 101f is an optional means, which will be described in the third embodiment.

There may be two or more core processing units 102. Although some or all of the functions of the data transfer unit 103 may actually be implemented by the main control unit 101, the main control unit 101 and data transfer unit 103 will be described separately below in order to clarify the description of software program data transfer.

The startup procedure carried out by the main control unit 101 in the digital broadcast receiver 100 in this embodiment will now be described with reference to the flowchart in FIGS. 3 and 4.

Figure 3:
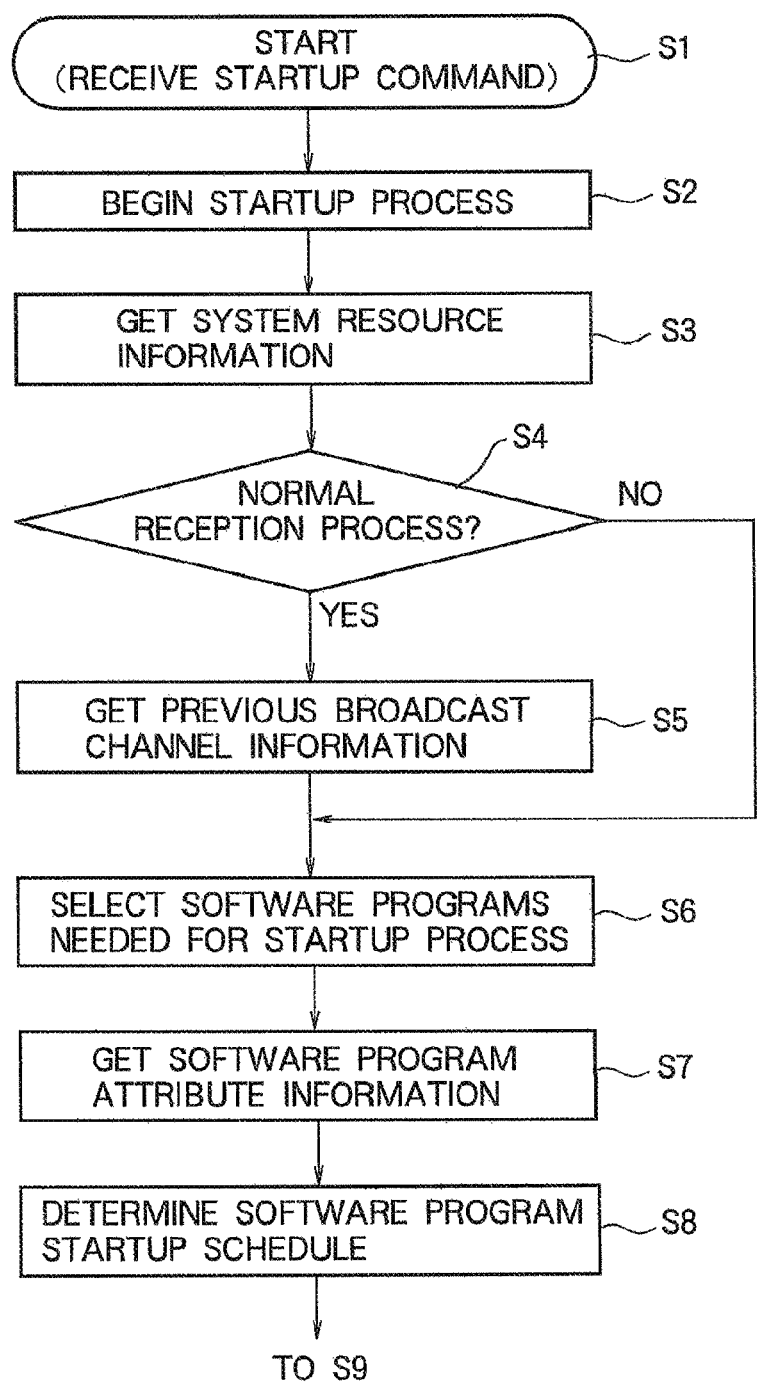
FIGS. 3 and 4 form a flowchart illustrating the startup procedure carried out by the main control unit in FIG. 2.

When the user turns on the digital broadcast receiver 100, the control input unit 110 receives a startup command from the user in step S1 in FIG. 3, and the main control unit 101 begins the startup process in step S2. The startup command may be given by a press of a button on a control panel in the control input unit 110, or the press of a button on a remote control unit, which sends a signal to a receiver in the control input unit 110. If the master power supply of the digital broadcast receiver 100 is already switched on, it can receive the startup command in either way. The digital broadcast receiver 100 may also have a startup control means (not shown) separate from the main control unit 101 that receives the startup command and simultaneously turns on the master power supply. Further description of the startup command processing performed by means other than the main control unit 101 will be omitted in order to concentrate on the processing after input of the startup command to the main control unit 101.

In step S3, the main control unit 101 obtains information concerning the system resources of the digital broadcast receiver 100. The system resource information includes the number of core processing units 102 controlled by the main control unit 101 and the number of channels on which data can be transferred concurrently by the data transfer unit 103. On the basis of the information obtained here, the main control unit 101 creates a schedule for the transfer of the necessary software program data in step S8.

Some operating systems are designed to increase the apparent number of core processing units or data transfer channels that can be used concurrently. For data transfer this works as follows. If the data transfer unit 103 is given commands to transfer data A and data B simultaneously but only one data transfer channel is available, the data transfer unit 103 accepts both commands, transfers part of data A for a certain period of time, then transfers part of data B for a certain period of time, and continues transferring data A and B alternately in this way. When the transfer of, e.g., data A is completed, the data transfer unit 103 informs the main control unit 101 and continues transferring data B. This is a form of multitasking.

Multitasking is performed in like manner in the main control unit 101. For example, when a plurality of software programs are executed, the programs to be executed are chosen at regular intervals and take turns using the core processing units.

Figure 5A:
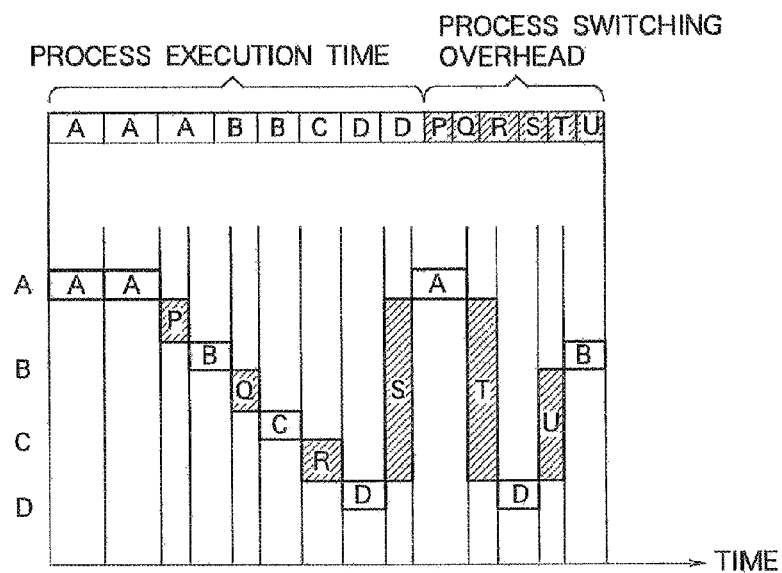
FIGS. 5A and 5B illustrate process execution time and processing switching time in a multitasking scheme used by the main control unit or data transfer unit in FIG. 2.
Figure 5B:
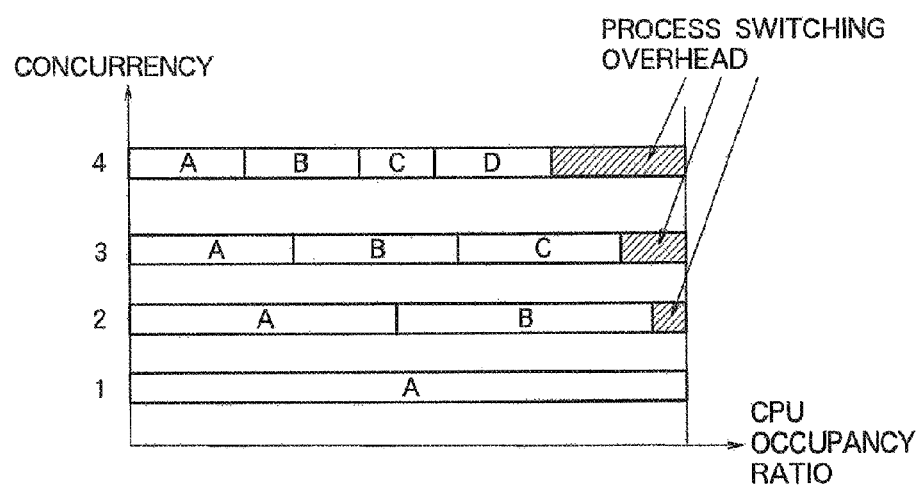

FIGS. 5A and 5B illustrate the relationship between the number of concurrent processes and their processing time in multitasking execution by the main control unit 101 or data transfer unit 103 in the digital broadcast receiver in this embodiment. Multitasking in the main control unit 101 will be described below. The data transfer unit 103 performs multitasked data transfer in the same way. FIG. 5A shows an example of multitasking in which four processes A, B, C, D are executed concurrently.

First, process A is executed for a certain period of time, and then it is decided to continue the same process A in the next period. Since the process does not change, the switchover between these two periods is very short. After process A has executed in the second period, it is decided to execute process B in the third period. A switching overhead interval P now follows in which temporary information of process A, which has not yet ended, is saved in a temporary storage area in the main control unit 101, similar temporary information, if any, belonging to process B is restored from the temporary storage area in the main control unit 101, and other preparations for the execution of process B are made. Process B is executed following this process switching overhead period P.

After process B, processes C, D, A, D, B are executed in this order, with intervening switching overhead intervals Q, R, S, T, U. The bar at the top of FIG. 5A separates the total time until the final end of process B into the time required for process execution and the overhead time required for process switching. The bar graph in FIG. 5B shows an exemplary relationship among the number of processes executed concurrently, their process execution time, and their process switching overhead. The greater the number of concurrent processes becomes, the greater becomes the proportion of the total processing time taken up by process switching, indicated as a CPU occupancy ratio on the horizontal axis.

As the number of processes executed concurrently in multitasking increases, the amount of temporary information to be saved in the periods between process execution generally increases, increasing the time required to search for the locations to or from which the temporary information is to be saved or restored. The temporary storage area in the main control unit 101 where the temporary information is saved has a relatively small capacity and a high read-write speed. If the number of concurrent processes increases to the point that their temporary information cannot all be saved in the main control unit 101, some of the temporary information is saved in the main storage unit 105, which has a larger capacity but a lower read-write speed. Accordingly, when the number of concurrent processes exceeds a certain threshold, great surges occur in the time required for process switching.

The total execution time Tt(A, n) for multitasking execution of n processes on an equal basis is given by the equation below, in which T(A) is the time for executing a process A when only a single process is executed, n is the number of processes (including process A) to be executed concurrently by multitasking, and To(n) is the process switching overhead time per unit time (time periods P, Q, R, S, T, and U in the FIG. 5A). In this equation, all types of processes executed by multitasking have the same execution time, which is the time required to execute process A.

$$Tt(A, n) = T(A) \times n \times (1 + To(n))$$

Tt(A, n) is a positive-valued function with different values for different components of the digital broadcast receiver 100. The total execution time of n processes that equally share the use of the main control unit 101 will be denoted Ttc(A, n); the total execution time of n processes that equally share the use of the data transfer unit 103 will be denoted Ttd(A, n).

Later, in step S8, a schedule that works within the limited number of core processing units 102 and data transfer channels that can operate concurrently without multitasking will be created, as far as possible. If a startup schedule exceeding those limits is permitted, a maximum limit N on the number n of concurrently executable processes is predetermined, and the corresponding values of Ttc(A, n) and Ttd(A, n) (n=1, . . . , N) are obtained beforehand and used in calculation of the transfer time. It is important, however, to schedule the software program startup process so as to avoid multitasking if at all possible.

In step S4, a startup process type acceptor 101a in the main control unit 101 determines the type of startup process specified by the user. The digital broadcast receiver 100 allows several types of startup processes, including a normal broadcast reception startup process that leads to immediate reception and output by the broadcast signal decoder 111 and the output unit 112, and an update startup process that leads to an update of software program data in the digital broadcast receiver 100 by use of broadcast data, instead of normal broadcast reception. If the decision in step S4 is to perform normal reception, the processing proceeds to step S5. Otherwise, step S5 is skipped and the processing proceeds to step S6.

In step S5, the digital broadcast receiver 100 obtains broadcast channel information from the most recent reception process. For example, the digital broadcast receiver 100 obtains the channel last selected or preset by the user in the most recent operation. This information may be stored in the auxiliary storage unit 104, for example, and read as soon as the startup process begins.

In step S6, a software program classifier 101b in the main control unit 101 selects the software programs necessary for the startup process. The software programs that implement the functions of the digital broadcast receiver 100 are stored in a software program storage section in the auxiliary storage unit 104. These software programs include a tuner component control software program for receiving the broadcast signal, a descrambler control software program for descrambling data scrambled for conditional access systems, a demultiplexer control software program for selecting just the necessary data from the digital broadcast signal, a decoder control software program for decompressing the signal data, an output control software program for displaying and reproducing the decompressed video information or audio signal appropriately, a user interface software program for displaying on-screen menus and processing user-specified commands, and a data broadcast control software program for decoding the additional information in the digital broadcast signal and displaying graphics. The digital broadcast receiver 100 operates by reading and executing the software program data selected in step S6.

If it has been determined in step S4 that normal reception is to be performed, the software programs related to the audio and video output functions of the digital broadcast receiver 100 are given priority for startup. Data broadcast control software programs, which handle additional broadcast data, are not needed for the time being and are excluded from the first startup schedule. The tuner component control software program, decoder control software program, and other programs needed to receive digital broadcasts are selected for transfer and execution. The criteria for selecting the software programs needed for different types of startups may be stored in the auxiliary storage unit 104 and read by the main control unit 101 in step S6.

If it has been determined in step S4 that startup for a purpose other than normal broadcast reception is to be performed, a different startup process is executed. For example, if the startup process selected in step S4 reads software program code from the broadcast signal and uses it to replace an existing software program in the digital broadcast receiver 100, the startup process requires the tuner component control software program, a demultiplexer control software program for extracting the program code from the broadcast signal, a download control software program for storing the extracted program in the auxiliary storage unit 104 of the digital broadcast receiver 100, and so on. Those programs are selected in step S6. Since the received broadcast signal is not displayed to the user, the decoder control software program and the output control software program are not needed.

In step S7, attribute information pertaining to the selected software programs is obtained. The attribute information includes the time required to transfer the software programs from the auxiliary storage unit 104 to the main storage unit 105 and the time required to initialize the software programs transferred to the main storage unit 105. As explained above, these times may vary depending on the number of programs that can be transferred or executed concurrently; the times given in the attribute information are for the case in which only one software program is transferred and executed. The attribute information may be stored in the attribute data storage section in the auxiliary storage unit 104 beforehand and read by the main control unit 101 in step S7.

Among the software program attribute information, the time required to transfer a software program from the auxiliary storage unit 104 to the main storage unit 105 and the time required to initialize the software program transferred to the main storage unit 105 can be determined from the types of components used in the digital broadcast receiver 100, their performance, the type of operating system, its performance, and other relevant conditions. The digital broadcast receiver 100 may measure these times while the software program data are actually being transferred or initialized and may store the measured time information as attribute information in the auxiliary storage unit 104.

In step S8, a software program startup schedule is created in accordance with the following input information: the types of software programs to be transferred and executed; the time required to transfer the software program data from the auxiliary storage unit 104 to the main storage unit 105; the time required for initialization processing to be executed by the software programs after the software program data are transferred to the main storage unit 105; information (type information) about other software programs that are needed to execute the software programs; the number of core processing units 102 that can be used concurrently; the function Ttc(A, n) for calculating total processing time, including process switching overhead, when processing concurrency is allowed to exceed the number of core processing units 102; the core processing concurrency limit Nc; the actual number of data transfer channels provided by the data transfer unit 103; the function Ttd(A, n) for calculating the total data transfer time, including process switching overhead, when data transfer concurrency is allowed to exceed the actual number of channels; and the data transfer concurrency limit Nd.

On the basis of this information, the scheduler 101c in the main control unit 101 creates a software program startup schedule.

The core processing concurrency limit Nc may be equal to or greater than the actual number of core processing units 102. The concurrency limits Nc and Nd should be determined beforehand as design values specified in accordance with the increment of the function Ttc(A, n) or Ttd(A, n) as n increases. The concurrency limits may also be allowed to vary with the processing load on the digital broadcast receiver 100 and the processing status of the startup schedule.

The startup schedule includes at least the following information: the software programs to be transferred and executed; data transfer start timings; software program execution start timings; and information specifying other software programs that are needed to execute the transferred software programs. The core processing concurrency limit Nc and the data transfer concurrency limit Nd may also be included in the startup schedule.

An exemplary startup schedule and its effect will be described later.

In step S9, whether there is a software program to be transferred is determined. Since the startup schedule specifies the data transfer start times, the main control unit 101 can determine correctly whether there is a software program to be transferred by referring to, for example, a system clock maintained by the digital broadcast receiver 100. As an alternative to the use of time information, when the startup schedule specifies the data transfer concurrency limit, and particularly when the limit is equal to the actual number of channels, the current number of channels being used by the data transfer unit 103 may be obtained in step S9. If the current number is smaller than the concurrency limit, the software program to be transferred next may be transferred.

In step S10, the data transfer controller 101d in the main control unit 101 issues a transfer start command to the data transfer unit 103.

In step S11, whether there is an executable software program is determined. Since the startup schedule also specifies the execution start timings, the main control unit 101 can determine correctly whether there is a software program to be executed by referring to the digital broadcast receiver's system clock, for example, or by comparing the number of core processing units currently in use with the core processing concurrency limit. It must be noted in this step that some software programs can only be executed after the initialization of another software program is completed. The inclusion of information about these dependencies simplifies the execution of step S11.

In step S12, the software program executor 101e in the main control unit 101 gives a command to start executing the corresponding software program in the main storage unit 105. In step S13, whether the execution of all scheduled software programs has begun is determined, and a return to step S9 is made if this is not the case. Steps S9 to S13 are repeated until the execution of all scheduled software programs has begun, at which point the process ends (step S14).

Figure 4:
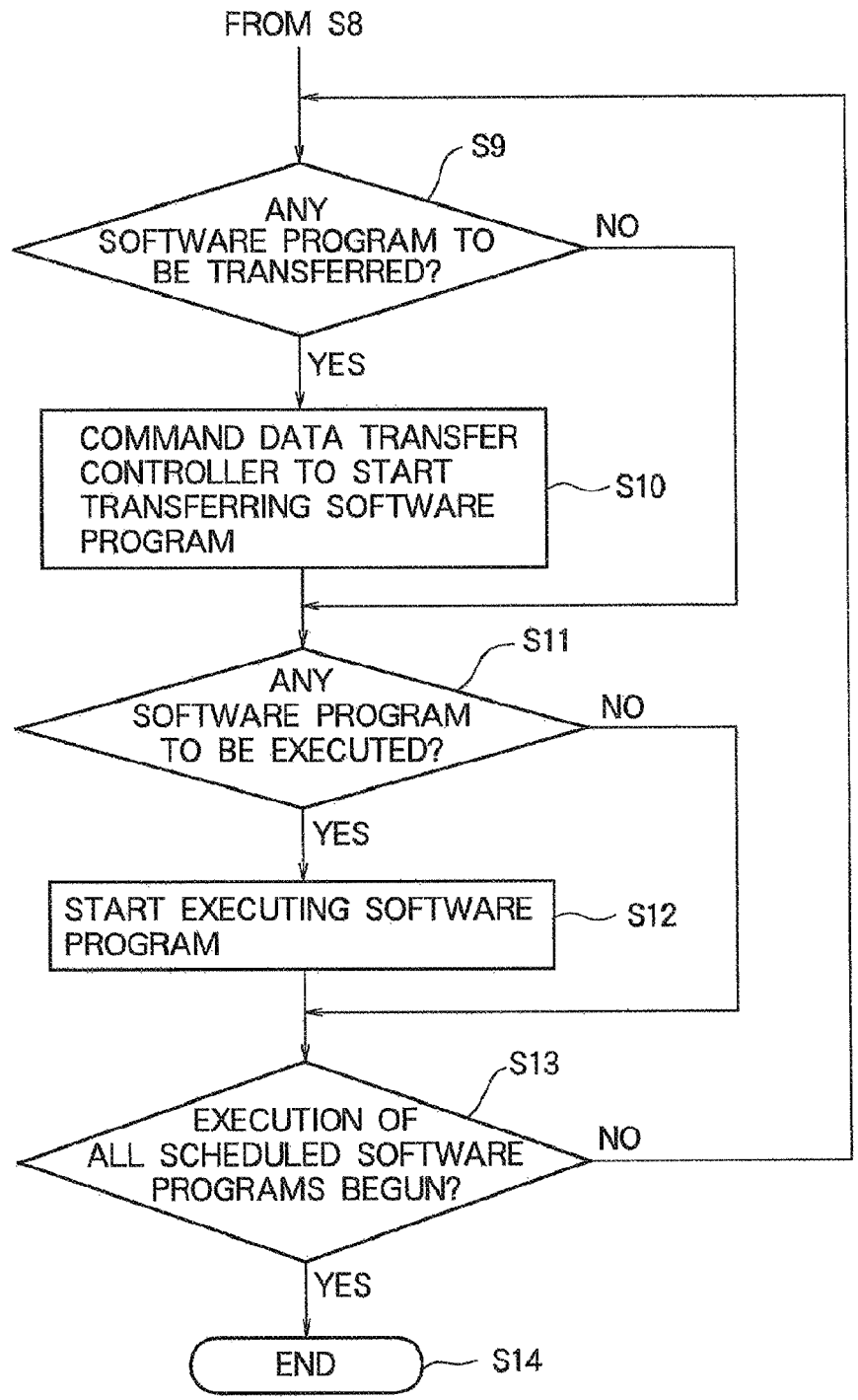

For ease of understanding, the flowchart in FIGS. 3 and 4 illustrates the case in which a new function starts after the initialization of all the software programs selected in step S6 is completed. In the actual startup process in a digital broadcast receiver, however, a function such as an electronic program guide function may start midway through the startup of the broadcast reception function. In that case, whether to start another function should be determined immediately before step S13. If it is decided to start a new function, the software programs to be started at that point should be selected again in step S6.

In the digital broadcast receiver 100 configured as described above, the scheduler 101c, data transfer controller 101d, and software program executor 101e in the main control unit 101 cooperate to reduce the time until completion of the initialization of the software programs needed in the startup process, and can thereby shorten the time until broadcast audio and video is received and reproduced.

In step S8, the startup sequence having the shortest startup time can be selected by examining all possible startup sequences. When the number of software programs is relatively small, the data transfer and core processing concurrency limits are relatively low, and consequently the number of startup sequences possible within those limits is relatively small, it is practical to calculate the startup times of all possible schedules and select the shortest. When the number of possible startup schedules is too large for an exhaustive calculation of their startup times, a startup schedule having a relatively short startup time can be derived by a method such as linear programming in a practical amount of time short enough so as not to lengthen the overall startup time significantly. An exemplary startup schedule and its effect will now be described.

FIG. 6A lists examples of software programs needed in the startup of the digital broadcast receiver 100 in this embodiment and the relevant attribute information input to calculate the startup schedule. Five software programs A, B, C, D, E are executed, listed here in ascending order of priority level. The level of dependence on other software programs matches the execution priority level. Software programs A, B, C, D require substantially the same data transfer time; software program E requires about five times as much transfer time as the other programs. The five software programs require substantially the same initialization time.

FIG. 6B lists the actual numbers of core processing units and data transfer channels and the concurrency limits on the apparent numbers of units and channels that may be created by multitasking. The digital broadcast receiver 100 in this example has a single core processing unit 102. The data transfer unit 103 can transfer data on two channels concurrently. To avoid the long process switching times that may occur in multitasking, the concurrency limit Nc on core processing is specified at '1', and the concurrency limit Nd on data transfer is specified at '2'.

FIG. 7A shows an exemplary startup schedule calculated on the basis of the attribute information given in FIGS. 6A and 6B. The schedule includes the data transfer start timings and execution start timings of software programs A, B, C, D, E, and other software programs needed for execution of each of these programs. The data transfer concurrency limit Nd is '2', and the core processing concurrency limit Nc is '1', as indicated in FIG. 7B. The data transfer start timings and execution start timings of the software programs are calculated from the data transfer times and initialization times of the software programs to be started. The information about the execution priority levels of the software programs is not included in the example in FIG. 7A, but may be included if desired for future reference, to allow an execution order to be determined when the execution of either one of two software programs can be started.

FIG. 8 shows a graph comparing the startup time of three hypothetical schedules that might be created by the scheduler 101c. Schedule X, shown at the top of FIG. 8, is based on the startup schedule created in step S8 in FIG. 3 in this embodiment and shown in FIG. 7A. If the values of Nc and Nd are equal to the actual numbers of the corresponding elements, the startup time until the end of initialization of all possible combinations can be obtained relatively easily when the startup schedule is determined. From the possible combinations, one that satisfies the dependence conditions and provides the shortest startup time should be selected. In schedule X, data transfer of software program E starts early despite the low priority of this program, because software program E requires a long data transfer time. The software programs are initialized one by one in their dependence order. In the startup schedule created as a result, both the data transfer unit 103 and the main control unit 101 operate nearly constantly with little wasted time.

Schedule Y, shown in the middle of FIG. 8, is based strictly on the execution priority levels of the software programs. For ease of comparison, the concurrency limits are the same as for schedule X. Software programs A and B are transferred first, after which the initialization of the non-dependent software program A begins. After the initialization of software program A is completed, the initialization of software program B begins. In the meantime, as soon as the data transfer of software programs A and B is completed, the data transfer of software programs C and D begins. When the data transfer of software program C is completed, after a wait for the initialization of software program B to end, the initialization of software program C begins. When the initialization of software program C ends, the initialization of software program D begins. The data transfer of software program E starts as soon as the data transfer of software programs C and D is completed. When the initialization of software program D ends, the initialization of software program E could start, but the data transfer of software program E is not completed yet, so the main control unit is left idle and performs no significant processing for a while. When the data transfer of software program E is completed, the initialization of software program E begins. The startup time for schedule Y is longer than the startup time for schedule X because schedule Y leaves the main control unit idle for an extended period between the initialization of software programs D and E.

Schedule Z, shown at the bottom of FIG. 8, ignores the limited number of core processing units and data transfer channels and starts transferring all the necessary software programs at once. To transfer the data of all five software programs concurrently, the data transfer unit 103 resorts to multitasking of the data transfer processes. This greatly lengthens the data transfer times, because of the transfer process switching overhead. Once transferred, the software programs are initialized one by one in order of their execution priority levels. If the main control unit initializes software programs of equal execution priority by multitasking, further time may be spent on initialization process switching overhead.

In the digital broadcast receiver of this embodiment, software program data transfer and other startup processing are executed in accordance with a schedule created by the main control unit as described above. The schedule is arranged to reduce the startup time as a whole by, for example, starting the data transfer of a program with low execution priority and a long data transfer time early, despite its low priority level. In addition to providing improved convenience for the user, such scheduling can reduce the cost of the digital broadcast receiver, since expensive components are not needed to provide good performance.

The operation of the main control unit in scheduling the start of audio and video reception processing in the digital broadcast receiver has been described above. The main control unit can create similar startup schedules for the reception of data broadcasts, an electric program guide, and other additional information to shorten the startup time of all types of software programs.

The software startup procedure of the digital broadcast receiver in this embodiment has been described above. Similar methods can be applied to the startup of the software of other devices that need to activate a plurality of functions at startup. In any such device, the time needed to complete startup can be reduced by defining the end of startup in accordance with the features of the device, selecting the functions needed to complete the startup, selecting the required software programs, and starting the software programs according to the above startup procedure. For example, the startup of a personal computer can be defined as complete when the screen display function and the functions that allow input from the user have become available, and the software programs needed for these functions can be started in a short time. In a mobile phone, this method can reduce the time needed to complete the startup of functions such as the human interface functions by which the user operates the phone and the communication functions by which calls are originated and answered and text messages are sent and received.

Second Embodiment

FIG. 9A shows exemplary software program attribute information forming the input information on the basis of which the startup schedule of the digital broadcast receiver in a second embodiment of the invention is determined. The digital broadcast receiver in the second embodiment has the same structure as in the first embodiment. The startup schedule is determined as illustrated in the flowcharts shown in FIGS. 3 and 4, and software program data transfer processing and execution start processing are performed accordingly. FIG. 9B lists the numbers of core processing units and data transfer channels and the concurrency limits on core processing and data transfer. In the second embodiment, the software program attribute information shown in FIGS. 9A and 9B is read in step S7 in FIG. 3 as the information input to calculate the startup schedule in step S8.

The attribute information table in FIG. 9A differs from the table in FIG. 6A in the first embodiment in having additional columns for startup type and working data transfer time. Software program F in FIG. 9A permits normal startup and two types of snapshot startup. In normal startup, no working data are transferred and the working data transfer time is zero. Software program G permits normal startup and one type of snapshot startup. Software program H permits only normal startup.

For each software program, the table gives information about data transfer times and initialization time for each permitted startup type.

FIG. 10A shows an exemplary startup schedule calculated from the input information in FIG. 9A. This schedule differs from the startup schedule in the first embodiment shown in FIG. 7A by also specifying the startup type of each program. For example, software program F is started in its first snapshot startup mode, and software program G is started in the normal startup mode. FIG. 10B gives the concurrency limits.

Figure 11:
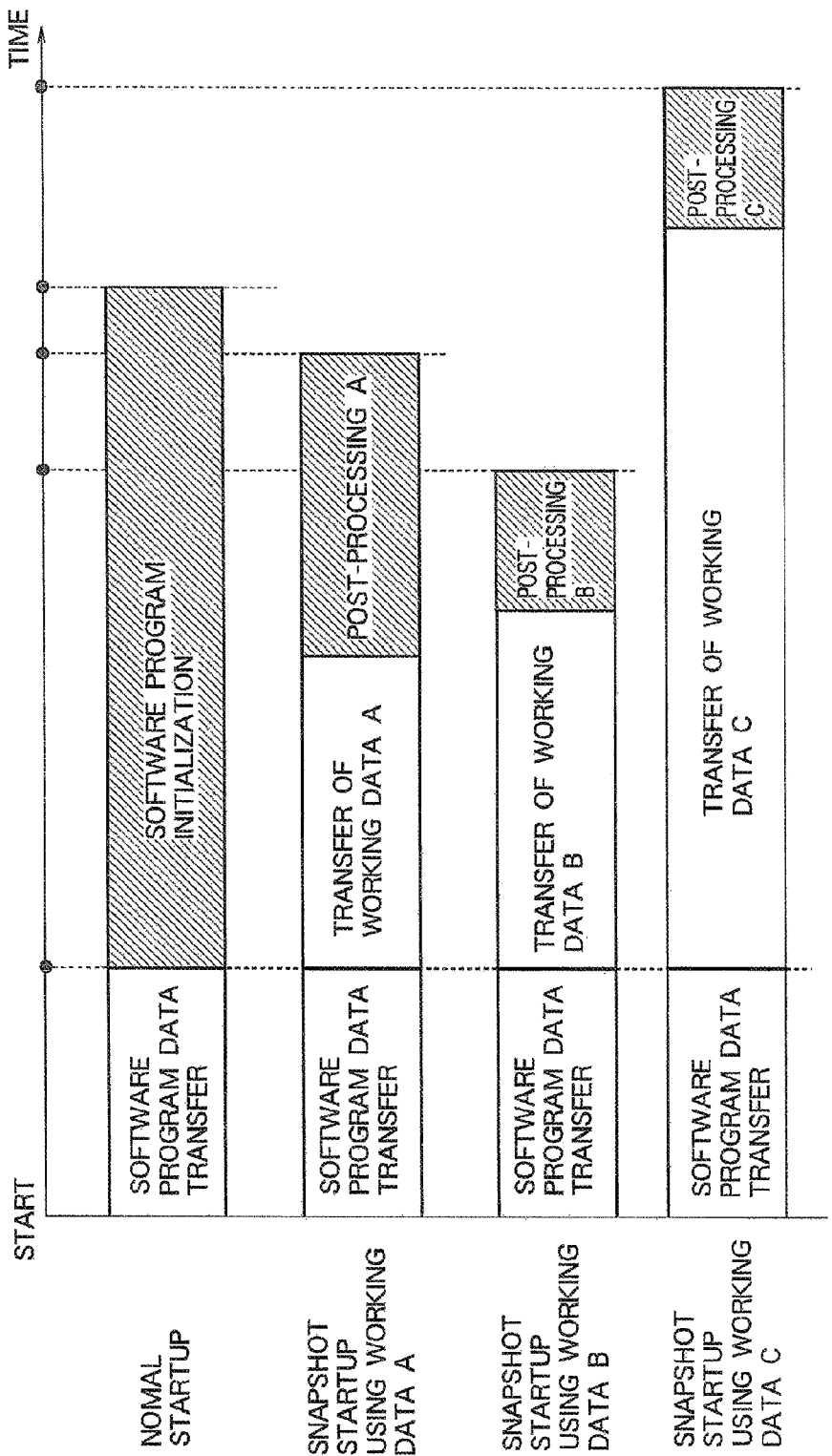
FIG. 11 compares software program data transfer time, software program initialization time, working data transfer time, and snapshot post-processing time in the second embodiment.

FIG. 11 shows compares the program data and working data transfer times, initialization times, and snapshot post-processing times for four types of startup of a hypothetical software program. The normal startup shown in the first row in FIG. 11 includes two processes: first the software program data are transferred from the auxiliary storage unit to the main storage unit; then the software program starts and performs initialization necessary for execution.

The first snapshot startup shown in the second row of FIG. 11 includes three processes: first the software program data are transferred as in normal startup; then working data A that had been generated partway through a previous software program initialization and were saved from RAM when the snapshot data were created are transferred; then post-processing A needed to complete program initialization and prepare for execution of program functions is carried out to reach the same state as attained by normal startup.

The second snapshot startup shown in the third row of FIG. 11 includes the same processes as the first snapshot startup but uses different working data B, saved at a different timing from working data A. The size of the working data part of the snapshot data and the length of the post-processing needed after the working data are read depend on the point in the initialization process at which the snapshot was taken. The first snapshot startup uses working data A taken at a relatively early timing while the software program was being initialized. Since a comparatively small number of initialization steps have been executed, the size of working data A is relatively small, but the post-processing after the transfer of the working data includes comparatively many initialization steps. Therefore, in the first snapshot startup, the time required to transfer working data A is relatively short and the post-processing time is relatively long. The working data B in the second snapshot startup were saved after a larger number of initialization steps had been executed by the software program. Working data B are larger in size than working data A, but fewer steps are left to be executed as post-processing. Therefore, the second snapshot startup has a longer working data transfer process than the first snapshot startup, but its post-processing is shorter.

The third snapshot startup shown at the bottom row of FIG. 11 uses working data C that were saved at a still later point in the initialization process than working data B. The initialization of some types of software programs generates huge quantities of working data in main storage. The size of working data C is so large that its transfer from auxiliary storage into main storage takes more time than needed for initialization in the normal startup. Thus snapshot startup time depends on the timing at which the snapshot was taken and may be longer than normal startup time. The selection of a snapshot startup does not always reduce the startup time of the digital broadcast receiver 100.

The digital broadcast receiver configured as described above calculates the startup times of both normal and snapshot startups for some types of software programs, and creates the startup schedule with the shortest startup time. By considering different startup options for the same software program, the method employed in this embodiment can test a wider range of schedules than the method in the first embodiment, and in many cases find a shorter startup time. Conversely, within a given startup time, more of the many software programs held in the digital broadcast receiver can be started up.

Only the initialization of the software programs has been described above, but a startup schedule can also be calculated by using attribute information for processing executed after initialization. After necessary initialization is completed, the digital broadcast receiver receives a digital broadcast signal and starts presenting the user with audio and video information. During this time, internal processing is performed continuously and the main control unit operates continuously. If software programs other than those for presenting audio and video information, such as software programs for receiving a data broadcast, are started during this period, they are preferably started by a method that has the smallest possible effect on the presentation of audio and video information and places the smallest possible load on the main control unit, which also reduces the startup time. In this case, the initialization time of the software programs for receiving a data broadcast can be reduced by adding attribute information indicating that the software programs for presenting audio and video information continue to use the main control unit even after their initialization is completed and that the data broadcast receiving software programs allow both normal startup and snapshot startup, and by scheduling the data broadcast receiving software programs for snapshot startup in accordance with this attribute information. Then the startup of the data broadcast receiving software programs can be completed quickly with minimum use of the main control unit and the effect on the presentation of audio and video information can be minimized.

Third Embodiment

Figure 12:
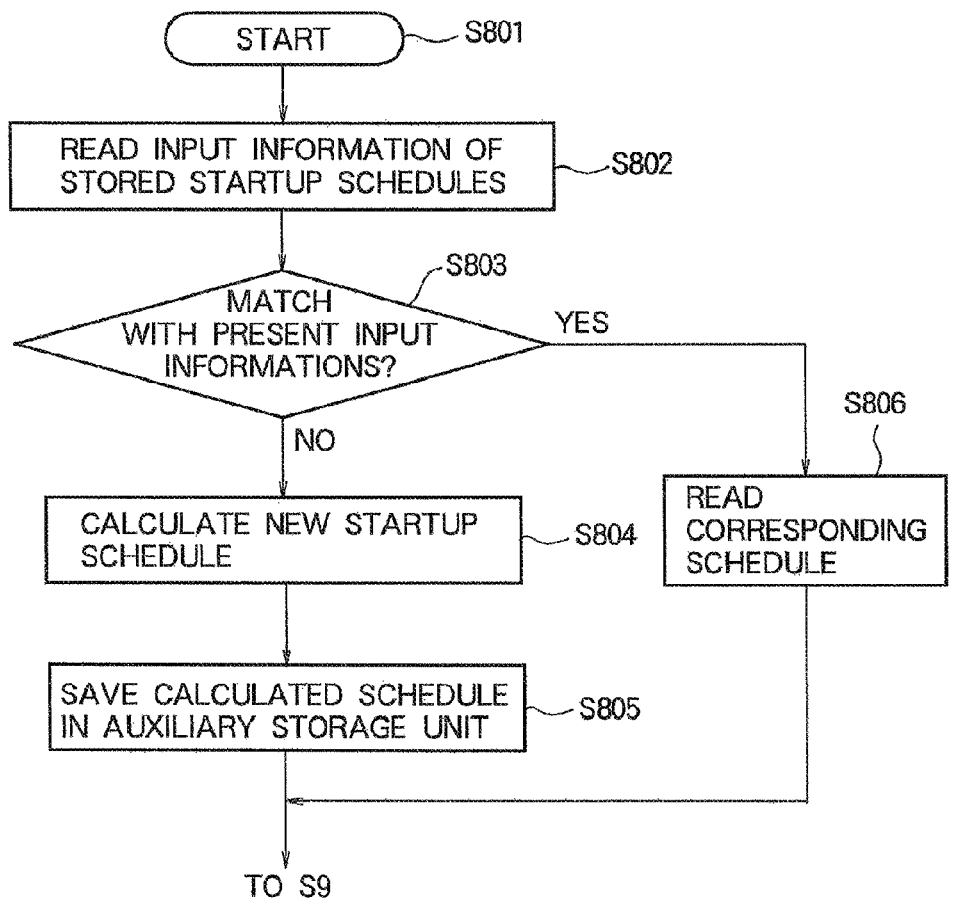
FIG. 12 is a flowchart illustrating the detailed procedure for determining the startup schedule in step S8 in FIG. 3 in the main control unit in a digital broadcast receiver in a third embodiment.

The digital broadcast receiver in the third embodiment of the invention is different from that in the first embodiment, in a point that the main control unit further includes a schedule saver for storing the schedule created by the scheduler in the auxiliary storage unit 104, and the scheduler 101c uses the schedule stored in the auxiliary storage unit 104 if the software programs selected by the software program classifier 101b match the software programs selected for the schedule stored in the auxiliary storage unit 104. Except for this point, the digital broadcast receiver in the third embodiment of the invention has the same structure as in the first embodiment. A startup schedule in the third embodiment is determined as illustrated in FIGS. 3 and 4. FIG. 12 shows a detailed procedure for determining the startup schedule in step S8 in the flowchart in FIG. 3.

The software programs executed to receive a broadcast signal immediately after the startup of the digital broadcast receiver include software programs that must be executed at every startup, such as the tuner component control, descrambler control, demultiplexer control, and decoder control software programs described in the first embodiment. In many startups, these software programs are always transferred from the auxiliary storage unit to the main storage unit under the same conditions. When the same types of software program data are used to control the same combination of components at every startup, the startup time can be further reduced by using a startup schedule calculated in the past instead of calculating a new startup schedule from scratch. In the third embodiment, a past startup schedule is reused in this way for software programs that must be readied for execution at every startup.

In step S802 in FIG. 12, input information that has been used to calculate a plurality of saved startup schedules is read. This information is stored together with the startup schedules themselves in the auxiliary storage unit, for example, from which the input information is read by the main control unit in step S802.

In step S803, whether the input information read in step S802 includes input information matching the input information to be used to calculate the present startup schedule is determined. If this is not the case, the startup schedule is calculated in step S804 in the same way as in step S8 in FIG. 3. In step S805, the calculated startup schedule and the corresponding input information are recorded in the auxiliary storage unit, for example, so that they can be read in step S802 in a subsequent startup.

If it is determined in step S803 that the input information to be used to calculate the present startup schedule has already been read in step S802, the corresponding startup schedule is read in step S806.

If the attribute information of the software programs to be started matches the pattern of the attribute information of a startup schedule created in the past, the time needed to determine a new startup schedule can be reduced by using the past startup schedule. The ratio of the startup scheduling time to the software startup time of the digital broadcast receiver can then be reduced. As pointed out in connection with FIG. 8 in the first embodiment, when there are many software programs to be started, the data transfer and core processing concurrency limits are high, and the number of possible schedules is very large, linear programming can be used to reduce the scheduling time, but if startup schedules created in the past can be used without the need for any calculation at all, the startup scheduling time can be reduced still further. The main control unit can use the time saved by not performing scheduling calculations to initialize the software programs and carry out other processing. The digital broadcast receiver can then be started up very quickly, adding still further to the user's convenience.

Those skilled in the art will recognize that further variations are possible within the scope of the invention, which is defined in the appended claims.

What is claimed is:

1. A digital broadcast receiver comprising:
a non-transitory main storage unit;
an auxiliary storage unit for storing a plurality of software programs and attribute information for each of the plurality of software programs;
a main control unit, coupled to the non-transitory main storage unit and the auxiliary storage unit, for
   accepting an instruction specifying a startup process type;
   selecting based on the startup process type, out of the plurality of software programs stored in the auxiliary storage unit, software programs necessary for the startup process type specified by the accepted instruction; and
   obtaining and reading the attribute information pertaining to the selected software programs; and
a data transfer unit, coupled to the main control unit, for transferring the selected software programs from the auxiliary storage unit to the non-transitory main storage unit;
wherein the attribute information includes data transfer time required to transfer each of the plurality of software programs from the auxiliary storage unit to the non-transitory main storage unit, initialization time required to initialize each of the plurality of software programs to be executed after being transferred to the non-transitory main storage unit, dependency condition information indicating dependency conditions that some of the plurality of software programs can be executed after initialization of another software program, a number of concurrent available core processing units controlled by the main control unit, and a number of concurrent available data transfer channels on which data can be transferred concurrently by the data transfer unit;
the main control unit, based on the attribute information,
   determines
      data transfer start timing and software program initialization start timing of each of the selected software programs, wherein the data transfer start timing is determined based on a number of concurrent software programs that can be transferred on the number of available channels and the software programs initialization start timing is determined based on a number of concurrent software programs that can be processed by the number of available core processing units;
   satisfies the dependency conditions, so that the software program initialization start timing falls after the data transfer time has passed since the determined data transfer start timing;
   calculates a plurality of software programs startup time schedules for different possible startup time sequences, of the data transfer start timing, of all the selected software programs while satisfying the dependency conditions, wherein a startup time is the time from starting to transfer each of the selected software programs until an end of initialization of each of the selected software programs; and
   generates a startup schedule, wherein the startup schedule is generated based on a startup time schedule having the shortest startup time sequence;
the data transfer unit starts to transfer each of the selected software programs according to the generated startup schedule; and
the main control unit starts initialization of the selected software programs transferred to the non-transitory main storage unit according to the generated startup schedule.

2. A digital broadcast receiver comprising:
a non-transitory main storage unit;
an auxiliary storage unit for storing a plurality of software programs and attribute information for each of the plurality of software programs;
a main control unit, coupled to the non-transitory main storage unit and the auxiliary storage unit, for
   accepting an instruction specifying a startup process type and selecting based on the startup type, out of the plurality of software programs stored in the auxiliary storage unit, software programs necessary for the startup process type specified by the accepted instruction; and obtaining and reading the attribute information pertaining to the selected software programs; and a data transfer unit, coupled to the main control unit, for transferring the selected software programs from the auxiliary storage unit to the non-transitory main storage unit;

wherein the attribute information includes startup types for each of the plurality of software programs, data transfer time required to transfer each of the plurality of software programs from the auxiliary storage unit to the non-transitory main storage unit, initialization time required to initialize each of the startup types and each of the plurality of software programs to be executed after being transferred to the non-transitory main storage unit, dependency condition information indicating dependency conditions that some of the plurality of software programs can be executed after initialization of another software program, a number of concurrent available core processing units controlled by the main control unit, and a number of concurrent available data transfer channels on which data can be transferred concurrently by the data transfer unit;

the main control unit, based on the attribute information, determines a startup type for each of the selected software programs;

data transfer start timing and software program initialization start timing of each of the selected software programs, wherein the data transfer start timing is determined based on a number of concurrent software programs that can be transferred on the number of available channels and the software programs initialization start timing is determined based on a number of concurrent software programs that can be processed by the number of available core processing units;

satisfies the dependency conditions, so that the software program initialization start timing falls after the data transfer time has passed since the determined data transfer start timing;

calculates a plurality of software programs startup time schedules for different possible startup time sequences, of data transfer timing and the startup types, of all the selected software programs while satisfying the dependency conditions, wherein a startup time is the time from starting to transfer each of the selected software programs until an end of initialization of each of the selected software programs; and generates a startup schedule, wherein the startup schedule is generated based on a startup time schedule having a shortest startup time sequence;

the data transfer unit starts to transfer each of the selected software programs according to the generated startup schedule; and the main control unit starts initialization of the selected software programs transferred to the non-transitory main storage unit according to the generated startup schedule.

3. The digital broadcast receiver of claim 1, wherein the main control unit causes the auxiliary storage unit to store information indicating the software programs selected according to the startup process type specified by the accepted instruction and the startup schedule generated based on the selected software programs; and when software programs selected according to startup process type specified by another accepted instruction correspond to the selected software programs indicated the information stored in the auxiliary storage unit, the main control unit causes the data transfer unit to start to transfer each of the selected software programs according to the startup schedule stored in the auxiliary storage unit.

4. A software startup method for a digital broadcast receiver including a main control unit, a data transfer unit, a non-transitory main storage unit and an auxiliary storage unit for storing a plurality of software programs and attribute information for each of the plurality of software programs, the software startup method comprising the following steps:

accepting a first instruction specifying a startup process type;

selecting, based on the startup process type, out of the plurality of software programs stored in the auxiliary storage unit, software programs necessary for the startup process type specified in the startup process type accepting step;

obtaining and reading the attribute information pertaining to the selected software programs, wherein the attribute information includes data transfer time required to transfer each of the plurality of software programs from the auxiliary storage unit to the non-transitory main storage unit , initialization time required to initialize each of the plurality of software programs to be executed after being transferred to the non-transitory main storage unit, dependency condition information indicating dependency conditions that some of the plurality of software programs can be executed after initialization of another software program, a number of concurrent available core processing units controlled by the main control unit, and a number of concurrent available data transfer channels on which data can be transferred concurrently by the data transfer unit;

transferring the selected software programs from the auxiliary storage unit to the non-transitory main storage unit;

determining, based on the attribute information, data transfer start timing and software program initialization start timing of each of the selected software programs, wherein the data transfer start timing is determined based on a number of concurrent software programs that can be transferred on the number of available channels and the software programs initialization start timing is determined based on a number of concurrent software programs that can be processed by the number of available core processing units;

satisfying the dependency conditions, so that the software program initialization start timing falls after the data transfer time has passed since the determined data transfer start timing;

calculating a plurality of software programs startup time schedules for different possible startup time sequences, of the data transfer start timing, of all the selected software programs while satisfying the dependency conditions, wherein a startup time is the time from starting to transfer each of the selected software programs until an end of initialization of each of the selected software programs; and generating a startup schedule, wherein the startup schedule is generated based on a startup time schedule having the shortest startup time sequence;

transferring each of the selected software programs according to the startup schedule; and starting initialization of the selected software programs transferred to the non-transitory main storage unit according to the startup schedule generated.

5. A software startup method for a digital broadcast receiver including a including a main control unit, a data transfer unit, a non-transitory main storage unit and an auxiliary storage unit for storing a plurality of software programs and attribute information for each of the plurality of software programs, the software startup method comprising the following steps:

accepting an instruction specifying a startup process type;

selecting, based on the startup type, out of the plurality of software programs stored in the auxiliary storage unit, software programs necessary for the startup process type specified by the instruction accepted;

obtaining and reading the attribute information pertaining to the selected software programs, wherein the attribute information includes startup types for each of the plurality of software programs, data transfer time required to transfer each of the plurality of software programs from the auxiliary storage unit to the non-transitory main storage unit, initialization time required to initialize each of the plurality of software programs to be executed after being transferred to the non-transitory main storage unit, dependency condition information indicating dependency conditions that some of the plurality of software programs can be executed after initialization of another software program, a number of concurrent available core processing units controlled by the main control unit, and a number of concurrent available data transfer channels on which data can be transferred concurrently by the data transfer unit;

transferring the selected software programs from the auxiliary storage unit to the non-transitory main storage unit;

determining, based on the attribute information, a startup type for each of the selected software programs, data transfer start timing and software program initialization start timing of each of the selected software programs, wherein the data transfer start timing is determined based on a number of concurrent software programs that can be transferred on the number of available channels and the software programs initialization start timing is determined based on a number of concurrent software programs that can be processed by the number of available core processing units;

satisfying the dependency conditions, so that the software program initialization start timing falls after the data transfer time has passed since the determined data transfer start timing;

calculating a plurality of software programs startup time schedules for different possible startup time sequences, of the data transfer start timing and the startup type, of all the selected software programs while satisfying the dependency conditions, wherein a startup time is the time from starting to transfer each of the selected software programs until an end of initialization of each of the selected software programs; and generating a startup schedule, wherein the startup schedule is generated based on a startup time schedule having the shortest startup time sequence;

transferring each of the selected software programs according to the startup schedule generated; and starting initialization of the selected software programs transferred to the non-transitory main storage unit according to the generated startup schedule.

6. The software startup method of claim 4, further comprising storing information indicating software programs selected in the selecting step and the startup schedule generated in the generating step in the auxiliary storage unit;

accepting a second instruction specifying a startup process type;

a second selecting, out of the plurality of software programs stored in the auxiliary storage unit, software programs necessary for the startup process type specified by the second instruction accepted;

specifying the startup schedule stored in the auxiliary storage unit, when the software programs selected in the second selecting correspond to the selected software programs indicated the information stored in the auxiliary storage unit;

a second transferring each of the selected software programs according to the startup schedule specified in startup schedule specifying step; and a second starting initialization of the selected software programs transferred to the main storage unit according to the startup schedule specified in startup schedule specifying step.

* * * * *